United States Patent Office 3,046,234
Patented July 24, 1962

3,046,234
STABLE ALKALINE SILICA SOLS CONTAINING CERTAIN DIALDEHYDES
Daniel P. Roman and Thomas A. Taulli, Florissant, Mo., assignors to Monsanto Chemical Company, St. Louis, Mo., a corporation of Delaware
No Drawing. Filed Dec. 7, 1959, Ser. No. 857,582
11 Claims. (Cl. 252—313)

The present invention relates to novel silica sols and particularly relates to novel stable alkaline silica aquasols.

The present invention further relates to stable alkaline silica sols which will not darken and develop noxious odors and scum layers.

It has been proposed, heretofore, to prepare silica aquasols by a variety of procedures. For example, silica aquasols may be prepared from aqueous sodium silicate solutions by treatment with cation-exchange resins operating on the hydrogen cycle thus reducing the sodium to $SiO_2$ ratio of the original sodium silicate solution and providing a sol having an $SiO_2$ to $NaO_2$ ratio in the range of about 10:1 to 500:1. Such procedures are described in general and in greater detail in U.S. Patent No. 2,244,325 to Paul C. Bird, granted June 3, 1941; U.S. Patent No. 2,457,971 to Vanderveer Voorhees granted January 4, 1949; U.S. Patent No. 2,573,743 to Henry S. Trail granted November 6, 1951, and U.S. Patent No. 2,574,902 to Max F. Bechtold and Omar E. Snyder granted November 13, 1951. Further, silica aquasols may be prepared by dispersing silica hydrogels at elevated temperatures in the presence of an aqueous solution of small amounts of sodium hydroxide for an alkaline heat stable silica aquasol, as described, for example, in U.S. Patent No. 2,375,738 to John F. White granted May 8, 1945, and U.S. Patent No. 2,572,578 to Henry S. Trail granted October 23, 1951, respectively. Moreover, silica aquasols may be prepared by removing the organic diluent from an alkaline organo-aquasol as described in U.S. Patent No. 2,515,949 to Vincent Di Maio granted July 18, 1950, or U.S. Patent No. 2,515,961 to Morris D. Marshall granted July 18, 1950, or by alkalizing an acidic organo-aquasol and removing the organic diluent therefrom as described in the aforesaid Di Maio and Marshall patents or as described in U.S. Patent No. 2,515,960 to Morris D. Marshall granted July 18, 1950.

All of the silica aquasols prepared by the procedures referred to in the preceding paragraph are alkaline having a pH in the range of about 8.5 to 10.5 and have an $SiO_2$ to $M_2O$ mol ratio, where M is an alkali metal, in the range of about 10:1 to about 200:1, and usually in the range of about 50:1 to about 175:1. These silica aquasols are also stable in that they remain fluid, that is, do not gel for periods of about 6 months or longer at 20° C. at silica concentrations of about 20% by weight. Depending on the particular procedure used, stable silica aquasols containing up to 40% by weight of silica can be prepared. All of these silica aquasols also contain relatively small amounts of water-soluble inorganic salts usually sodium sulfate or sodium chloride, or both, which originate from the raw materials, for example, sodium silicate or sulfuric acid, employed in their manufacture. Usually, such aquasols will contain less than 1.5%, for example in the range of 0.2 to 1.5%, by weight of such inorganic salts, and in most instances the aquasols prepared from sodium silicate and cation-exchange resins (for example, the process of the above Bird patent) or by dispersing a silica hydrogel (for example, the process of the above White patent) will contain less than 1%, for example, in the range of 0.1 to 1%, by weight of such inorganic salts.

In general, water-miscible organic liquids such as acetone, lower monohydric alcohols such as methyl, ethyl and propyl alcohol and water-miscible polyhydric alcohols such as glycerine, ethylene glycol and diethylene glycol can be incorporated in varying amounts, in the silica aquasols prepared as described above if such liquids are added in small quantities with adequate mixing. Not all of these silica aquasols will tolerate the same amounts of such organic liquids without precipitation of silica but amounts up to 5% by weight can usually be tolerated and in many instances amounts in the range of 1 to 20% by weight can be tolerated. Larger amounts up to 50% by weight of such organic liquids can be incorporated in the alkaline silica aquasols prepared according to the procedures of the aforementioned Marshall and Di Maio patents, possibly because of the "past history" of such aquasols in that they are prepared from precursor sols which originally contained a water-miscible organic liquid. In fact, the silica aquasols prepared by the procedures of the above-mentioned Marshall and Di Maio patents usually contain from about 0.05 to 1% by weight of a water-miscible organic liquid such as acetone or ethyl alcohol, which is not completely removed by the manufacturing process.

While the above-mentioned alkaline silica aquasols are suitable for a variety of commercial end uses, a high percentage of the material produced on a commercial scale darkens in storage in metal or other containers and, in many instances, these aquasols develop an undesirable odor (which has been likened to a sewage odor) under prolonged storage conditions or when stored at slightly elevated temperatures. In addition, it has been noted in an appreciable number of instances that a scum (which may vary in color, but is usually brownish) forms on the surface of the aforementioned silica aquasols, particularly after relatively long periods of storage, for example, three to twelve months, and at slightly elevated storage temperatures. The foregoing problems are usually even more pronounced and/or are encountered more frequently in the case of the aforementioned alkaline silica aquasols which contain water-miscible organic liquids, particularly the lower monohydric alcohols and polyhydric alcohols previously referred to. When these discoloration, odor or scum problems are encountered it is usually not possible to sell the silica sols so contaminated because the contaminated material is almost always unsuitable for the various end uses, for example, textile or paper treatment or incorporation in wax emulsions, etc., of the silica sols. Consequently, almost invariably the so-contaminated material must be discarded at considerable loss to the manufacturers.

The cause of the discoloration, odor and scum formation problems encountered with the aforementioned silica sols is not known, but it has been observed that these problems usually arise after the silica sols have been exposed to atmospheric air either during packaging in drums or during inventory storage in large tanks under the normal ambient temperature conditions existing in the temperate or tropical zones. It has been suspected that these problems of discoloration, etc., were related in some manner to the contamination of the silica sols with microorganisms such as anaerobic bacteria, fungi, molds, and other small organisms, but this had not definitely been established. Moreover, nothing is known in regard to the specie or species of organism, if any, which caused these problems.

It is one object of the present invention to provide a novel alkaline silica sol having a continuous liquid phase consisting essentially of water or water and a water-miscible organic liquid and which is not only suitable for use for a large variety of purposes but is also stable in storage for practical periods of time without appreciable darkening in color and without appreciable odor and/or scum formation.

It is a further object of the present invention to provide a novel alkaline silica aquasol containing small amounts of dissolved inorganic salts, and possibly small amounts of water-miscible organic liquids, and which is not only suitable for use in many commercial applications but also is stable in storage for periods of at least six months without appreciable darkening in color and without appreciable odor and/or scum formation.

Other objects and advantages of the present invention will be apparent from the following description and the appended claims.

It has presently been found that the incorporation of certain alkylene dialdehydes, in relatively small amounts, in stable alkaline silica sols having a continuous liquid phase consisting of water or water and up to 50% of a water-miscible organic liquid and a dispersed phase composed of colloidal silica particles, particularly sols containing from 0.1 to 1.5% by weight of a water-soluble inorganic salt, provides stable silica sols which do not darken or develop undesirable odors or scum formation even when stored for long periods, for example, from 2 to 18 months, depending on the original stability of such sols, and at elevated temperatures of 30 to 50° C. At such temperatures such a sol may acquire a slight yellowish cast especially after prolonged storage but this is not objectionable for the intended end uses of the sol. At storage temperatures below 40° C. there is usually no change in color of the freshly prepared sol. In all essential respects the physical and functional properties of the silica sol are not affected by the incorporation therein of the alkylene dialdehydes (hereinafter defined) in small amounts. By contrast, a silica sol of like composition, but not containing the above-referred to alkylene dialdehydes will, in most instances, darken and/or develop an undesirable odor and scum under identical storage conditions, and when any one of these conditions occur, the sol becomes unacceptable for most commercial end uses.

The alkylene dialdehydes contained in the sols of this invention are characterized by the structural formula:

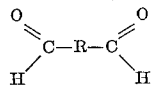

where "R" is an alkylene group containing from 1 to 13 carbon atoms in a straight, (that is, unbranched) chain and wherein "R" is further characterized by carbon atom chains containing an uneven or odd number of carbon atoms. As examples of such dialdehydes may be mentioned 1,3-propanedial, 1,5-pentanedial, 1,7-heptanedial, 1,9-nonanedial, etc. Such dialdehydes are further characterized in that they are soluble to the extent of at least 0.05% by weight in the aqueous sols herein described. These dialdehydes can be incorporated or added to such silica sols in the form of an aqueous solution, where solubility permits, or in solution in a water-miscible organic liquid which is miscible in the sol, and chemically inert to the alkylene dialdehydes and the sol. In order to obtain a homogeneous solution of the alkylene dialdehydes in the sol, it is usually desirable to use adequate mixing methods such as stirring or the like, but this is usually not essential since the alkylene dialdehydes will normally diffuse uniformly through the sol on storage before darkening, and/or odor, or scum formation can occur.

The alkylene dialdehyde which is preferred in the practice of this invention is 1,5-pentanedial (also known as glutaraldehyde), which is stable, soluble in water and in alkaline silica sols, is commercially available and imparts no odor to such sols. The addition of glutaraldehyde in amounts of from 0.01% to 0.05% by weight to the aforedescribed alkaline silica sols is sufficient to protect such sols against darkening and/or odor or scum formation for from 2 to 18 months under storage conditions which are normally encountered in commercial operations.

The alkylene dialdehydes, hereinbefore defined, should be incorporated in the sols in amounts sufficient to prevent darkening and the other undesirable properties (odor and scum formation), but the amount used preferably should not cause an appreciable change in the original color or odor characteristics of the freshly prepared sol. The minimum amount of the alkylene dialdehydes required will be influenced to some extent by the procedure used in preparing the sol, the atmospheric conditions existing at the time the sol is packaged and stored, the extent to which the container or storage tank has been previously contaminated, the duration and temperature of storage conditions and other factors.

Usually, when the sol contains at least 0.01% by weight of any of such alkylene dialdehydes, it is sufficiently protected against darkening and/or odor or scum formation under the storage conditions which are likely to be encountered, but it is possible in the case of certain silica sols to obtain satisfactory results with amounts as low as 0.002% by weight. Of course, larger amounts of any of the alkylene dialdehydes can be incorporated in the sols satisfactorily and insofar as the maximum useful amount is concerned this is governed solely by the consideration of the desirability of not materially changing the physical and functional properties of the original sol or its appearance or odor. For most purposes an upper limit of 0.05% by weight of an alkylene dialdehyde having an uneven numbered, straight carbon atom chain is satisfactory, but it is preferable to incorporate the glutaraldehyde in an amount not exceeding about 0.025% by weight in order to avoid imparting any unusual odor or color to the original sol. It can be seen from the foregoing that in general, a range of about 0.002 to about 0.05% by weight of glutaraldehyde can be employed but in most instances the preferred range is about 0.01% to 0.025%. Preferably, and stated in different concentration units, the sol contains from about 75 to 200 parts per million of the hereinbefore defined alkylene dialdehyde.

The stable alkaline silica sols, in which the hereinbefore defined alkylene dialdehyde compounds are incorporated, are characterized in that they have a continuous liquid phase of water, or water and quantities of a water-miscible organic liquid up to 50% by weight, and a dispersed colloidal silica phase of from 4 to 45% by weight, preferably 15 to 40% by weight, the colliodal silica having an ultimate particle size of about 5 to 50 millimicrons. The silica particles may consist of such ultimate particles or of average particles measuring between about 20 and 400 millimicrons which average particles are agglomerates or aggregates of the ultimate particles or the sol may contain both types of such particles. These stable alkaline silica sols are further characterized in that they have a pH between about 7.5 and 11, preferably a pH between 8.5 and 10.5, usually due to the presence of a monovalent base such as NaOH or $NH_4OH$ and contains less than 1.5% by weight (usually from 0 to 1.3% by weight) of an inorganic salt and have an $SiO_2$ to $M_2O$ ratio in excess of 10:1 and usually between 40:1 and 200:1, where M is a monovalent cation such as $Na^+$ or $NH_4^+$. A preferred stable, alkaline silica sol for the purposes of this invention may be prepared, in general, by heating a substantially neutral silica aquagel which is substantially free of salts or electrolytes, with a heat stable, alkaline silica aquasol containing a free basic compound in an amount sufficient to convert said aquagel to aquasol, at a temperature above 125° C. in a closed autoclave, under such conditions that boiling or ebullition is substantially prevented. After substantially all of the silica aquagel is thus converted to silica aquasol, the heating is discontinued and the silica aquasol is removed from the autoclave. The resulting sol can be concentrated by evaporation of water if this is desirable or necessary. The foregoing process is described in greater detail in Example I, which appears hereinafter, and in the Trail patent referred to above.

As mentioned above, the stable, alkaline silica aquasols employed herein contain less than 1.5% by weight of an inorganic salt. The presence or absence of an inorganic salt is not of importance insofar as the property of the aquasol to darken in color and/or develop an undesirable odor and scum during storage in the absence of the aforementioned alkylene dialdehydes is concerned. However, the presence of sodium sulfate in such aquasol ordinarily increases the rate of darkening and/or odor or scum formation in the absence of such alkylene dialdehyde compounds. The use of such dialdehydes successfully prevents or inhibits the darkening of the silica aquasol, even in those instances where the silica aquasol contains sodium sulfate.

A further understanding of the compositions and processes of this invention will be obtained from the following specific examples which are intended to illustrate the invention, but not to limit the scope thereof, parts and percentages being by weight unless otherwise specified.

*Example I*

A stable alkaline silica aquasol was first prepared as follows:

One thousand and one hundred parts of a heat-stable alkaline silica aquasol containing 15% of $SiO_2$, less than 0.6% of NaCl and 0.075% NaOH was adjusted to a pH of 10.5 (glass electrode) by the addition of a 10% sodium silicate solution, and charged to a steam jacketed autoclave. Two thousand one hundred eighty parts of a substantially neutral and substantially salt-free silica aquagel (prepared by reacting aqueous HCl and aqueous sodium silicate at pH4 allowing to gel, synergizing, crushing to one-inch lumps and then washing with water), and containing 12% of $SiO_2$, were charged to the autoclave. The autoclave employed was substantially filled with the above charge of aquasol and aquagel. The autoclave jacket was heated with steam at a temperature of 198° C., and the interior of the autoclave, above the batch, was subjected to steam at 200 pounds per square inch (gauge) pressure. The autoclave was heated for a period of 1¼ hours, after which the batch was cooled and drained from the autoclave. The resulting silica aquasol had a pH of about 9.5 (glass electrode). This sol was concentrated by evaporation until it contained 30% $SiO_2$ and had an $SiO_2$ to $Na_2O$ ratio of about 165 to 1.

Dispersion A was then divided into three equal portions designated as A-1 through A-3, respectively. A 25% aqueous solution of glutaraldehyde (1,5-pentanedial was added to dispersion A-1 in an amount sufficient to provide a 0.025% of glutaraldehyde based on the portion of dispersion A-1. A 25% aqueous solution of glutaraldehyde was added to dispersion A-2 in an amount sufficient to provide a 0.05% of glutaraldehyde based on the portion of dispersion A-2. Dispersion A-3 served as a control.

All dispersions, that is, A-1 through A-3 were inoculated with 0.4% of a dispersion similar to dispersion A which had darkened in color and developed an undesirable odor and scum in storage. The resulting dispersions were incubated for 8 weeks at 90° F. to accelerate the growth of organisms. At the end of 4 weeks, dispersion A-3 had darkened in color and developed a sewage type odor and a brownish scum had formed on the surface thereof. Dispersion A-3 was thus unsuitable for commercial use. On the other hand dispersions A-1 and A-2 showed no signs of darkening or developing an undesirable odor or scum after the eight week incubation period. The above-mentioned sols, that is, sols containing 0.025% and 0.05% of glutaraldehyde by weight, were stored at temperatures of 70°–100° F., for periods up to 18 months without such sols darkening or developing an undesirable odor or scum. Moreover, these sols did not gel during this storage period.

*Example II*

A silica dispersion was prepared by concentrating a silica aquasol prepared according to the procedure of the first paragraph of Example I to a silica content of 30% by evaporation and adding thereto an amount of ethylene glycol sufficient to provide 4% of ethylene glycol based on the silica aquasol. The resulting dispersion or sol (which is hereinafter referred to as dispersion A) had a freezing point of 10° F., and could be cooled to −15° F. to provide a frozen product which could be thawed to form a sol substantially identical with the sol which was subjected to freezing.

This dispersion or sol (which hereinafter will be called dispersion B) was divided into three equal portions which were respectively designated B-1 through B-3.

A 25% aqueous solution of glutaraldehyde was incorporated in dispersions B-1 and B-2 in the manner described in Example I for the corresponding portions of the dispersion A series. Dispersion B-3 served as a control.

Dispersions B-1 through B-3 were inoculated and incubated using the procedures and conditions described in the last paragraph of Example I. At the end of 4 weeks, dispersion B-3 had darkened in color and developed a sewage-like odor and a brownish scum had formed on the surface of each dispersion. This rendered dispersion B-3 unsuitable for commercial use. On the other hand, dispersions B-1 and B-2 which contained respectively 250 and 500 parts per million of glutaraldehyde showed no signs of darkening or of developing an undesirable odor or scum immediately after the eight-week incubation period.

*Example III*

One and seventy-six hundredths gallons of an acidic silica ethanol-aquasol at a temperature of 20° C. and having a specific gravity of 0.95, a silica content of 9.3% as silicic acid, an ethanol content of 51.88%, a sodium sulfate content of 0.26%, containing sufficient sulfuric acid to provide a pH of 3.2 (glass electrode) and the remainder consisting of water, was purified of large particle material by filtration through a sand bed filter. The filtered sol was then passed downwardly through a column (2 inches in diameter and 32 inches high) of particles of the hydrogen or acid form of "Amberlite" IR-120 (a strong cation-exchange resin consisting of water-insoluble beads of a copolymer of styrene and divinylbenzene, which copolymer contains nuclear sulfonic acid groups), at the rate of 0.06 gallon per minute. The resin employed had a capacity of 4.25 m.e. (milligram equivalents) per gram. The pH of the ethanol-aquasol was lowered to 1.92 (glass electrode) by this treatment, and this effluent was substantially free of sodium ions. The effluent from the cation exchange resin was placed in a glass container and was vigorously stirred while the particles of the base form of a weak anion-exchange resin were added using 100 grams of dry resin per gallon of sol. This resin, which had a capacity of 1.69 m.e. per gram, consisted of water-insoluble beads of the reaction product of diethylene triamine and a chloromethylated copolymer of about 87% of styrene, 5% of ethyl vinylbenzene and 8% divinylbenzene (Dowex 3). The resulting mixture was vigorously stirred for 40 minutes and the resin particles were then filtered out leaving an ethanol-aquasol containing less than 0.02% of salt, that is, salt of sodium ions and sulfuric acid ions, as $SO_4^-$ or $HSO_4^-$, or both.

One and seventy-six hundredths gallons of the sol as prepared above was added to three-fourths of a gallon of an aqueous solution of sodium silicate having an $SiO_2$ to NaO ratio of 3.25:1 and a pH (glass electrode) of 10.9 at 25° C. which silicate solution was initially at a temperature of 95° C., in a jacketed kettle provided with a condenser and stirrer. The sol was added to the silicate solution with vigorous agitation at atmospheric pressure and at the rate of 1.79 gallons per hour. During the addition of the sol ethanol was distilled from the kettle at atmospheric pressure and steam was passed through the kettle jacket at a temperature sufficient to provide a temperature in the contents of the kettle of 87° C., when all of the sol had been added. Distillation of the ethanol from the kettle at atmospheric pressure was continued and the temperature of the contents of the kettle was raised to 100° C. at atmospheric pressure to distill off water from the mixture until the SiO₂ content was 30%, a total of 2 gallons of distillate was collected at an average rate of 0.8 gallons per hour, the rate being higher during the addition of the acidic ethanol-aquasol but dropping off as ethanol was depleted from the mixture in the kettle by distillation. The final product in the kettle contained less than 0.1% by volume of mud or settable solids and was centrifuged to remove this large particle solid matter. This product was an alkaline silica aquasol which was physically stable, that is, would not gel or settle, for six months and longer at temperatures of 5–30° C., but tended to darken and to develop the sewage type odor and scum formation previously described. The alkaline silica aquasol had the following characteristics:

| | |
|---|---|
| Specific gravity | 1.201 |
| Total solids percent | 30.1 |
| NaOH do | 0.28 |
| Na₂SO₄ do | 0.029 |
| pH (glass electrode) at 25° C | 9.61 |
| Viscosity at 25° C centipoises | 7.3 |
| Readability ¹ inches | 15 |
| Particle size ² millimicrons | 15 |
| Extinction coefficient | 0.0104 |

¹ Depth of sol through which 8 point newsprint could be read under ordinary light.
² As determined from electron micrograph of air dried film of sol diluted to 0.01% SiO₂ content with water.

The above described dispersion or sol (which is hereinafter referred to as dispersion C) was divided into 3 equal portions and designated as C–1 through C–3, respectively. A 25% aqueous solution of the alkylene dialdehyde, glutaraldehyde (1,5-pentanedial) was added to dispersion C–1 in an amount sufficient to provide 0.025% by weight of glutaraldehyde based on the portion of dispersion C–1. A 25% aqueous solution of glutaraldehyde was added to dispersion C–2 in an amount sufficient to provide 0.05% by weight of glutaraldehyde based on the portion of dispersion C–2. Dispersion C–3 was the control.

As in Example I, all dispersions, that is C–1 through C–3 were inoculated with a dispersion similar to dispersion C but which had darkened in color and developed an undesirable odor and sum layer formation. The resulting dispersions were incubated for eight weeks at 90° F. At the end of four weeks dispersion C–3 had darkened in color and developed a sewage type odor and a brownish scum had formed on the surface thereof. Dispersion C–3 was thus unsuitable for commercial use. On the other hand, dispersions C–1 and C–2 showed no signs of darkening or developing an undesirable odor or scum after the eight week incubation period.

Whereas glutaraldehyde (1,5-pentanedial) has been specifically described in the above examples, 1, 3-propanedial, 1, 7-heptanedial; 1, 9-nonanedial and other compounds of the series of alkylene dialdehydes hereinbefore defined can also be used instead of glutaraldehyde in the specific sols of the above examples to prevent darkening and the development of undesirable odors and scum formationmations in silica aquasols and silica aquasols containing aliphatic alcohols.

On the other hand, it has presently been found that monaldehydes such as formaldehyde, acetaldehyde and like can be added in amounts of up to 0.05% by weight to the alkaline silica aquasols of Examples 1 through 3 without achieving the above results obtained with the aforedescribed dialdehydes. For example such sols were inoculated with 0.4% by weight of a sol similar to the aforementioned freshly prepared alkaline silica aquasols but which had darkened in color and developed an undesirable odor and scum in storage. They were then incubated for 8 weeks as in Examples 1 to 3. At the end of four weeks, all the sols containing formaldehyde and acetaldehyde had darkened in color, developed a sewage type odor and a scum had formed on the surface thereof.

Furthermore, it has presently been found that when alkylene dialdehydes having an even number of carbon atoms in the alkylene chain, for example 1,2-ethanedial (also known as glyoxal) are added to alkaline silica sols, such dialdehydes do not prevent the above described darkening and/or odor or scum formation when added in amounts up to 0.05% by weight to the alkaline silica aquasols.

The silica sols or dispersions of the present invention may be used in the same manner as the stable alkaline silica aquasols, that is, for the treatment of a freshly printed paper according to U.S. Patent No. 2,673,520 to John Bainbridge, granted March 30, 1954, and for the treatment of textiles as described in U.S. Patent No. 2,696,444 to Elmer H. Rossin, granted December 7, 1954, or U.S. Patent No. 2,443,512 to Donald H. Powers and William J. Harrison, granted June 15, 1948.

What is claimed is:

1. A composition of matter consisting essentially of (1) a stable alkaline silica sol having a colloidal silica disperse phase and a liquid continuous phase which liquid is selected from the group consisting of water and a solution of water and a water-miscible organic liquid selected from the group consisting of acetone and water miscible monohydric and polyhydric alcohols, in which solution said organic liquid is present in amounts of up to 50% by weight and (2) from about 0.002% to about 0.05% by weight of a dialdehyde having the structural formula

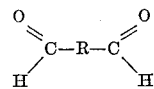

wherein R is an alkylene group containing from 1 to about 13 carbon atoms and wherein R is further characterized by a straight carbon atom chain having an uneven number of carbon atoms, said dialdehyde being further characterized in that it is soluble in said sol in an amount of at least 0.05% by weight.

2. The composition of claim 1 but further characterized in that said liquid is ethylene glycol.

3. The composition of claim 1 but further characterized in that said liquid is diethylene glycol.

4. The composition of claim 1 but further characterized in that said liquid is glycerol.

5. The composition of matter consisting essentially of a stable alkaline silica aquasol having a pH in the range of about 8.5 to about 10.5, and having an SiO₂ to M₂O molecular ratio, where M is an alkali metal, in the range of about 40:1 to about 200:1, containing from about 5% to about 45% by weight of colloidal silica, and from about 0.002 to about 0.05% by weight of a dialdehyde having the structural formula

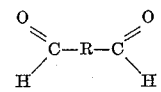

wherein R is an alkylene group containing from 1 to about 13 carbon atoms and wherein R is further characterized by a straight carbon atom chain having an uneven number of carbon atoms, said dialdehyde being further characterized in that it is soluble in said sol in an amount of at least 0.05% by weight.

6. The composition of claim 5 but further characterized in that the dialdehyde is 1,3-propanedial.

7. The composition of claim 5 but further characterized in that the dialdehyde is glutaraldehyde.

8. The composition of claim 5 but further characterized in that the dialdehyde is 1,7-heptanedial.

9. The composition of claim 5 but further characterized in that the dialdehyde is 1,9-nonanedial.

10. A composition of matter consisting essentially of a stable, alkaline silica aquasol having a pH of from 8.5 to 10.5 and an $SiO_2$ content of from about 15% to about 40% by weight, an $SiO_2$ to $Na_2O$ mol ratio in the range of about 50:1 to about 175:1 and an inorganic salt content of less than 1.5% by weight and containing from about 0.01% to 0.025% by weight of a dialdehyde having the structural formula

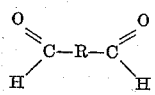

wherein R is an alkylene group containing from 1 to about 13 carbon atoms and wherein R is further characterized by a straight carbon atom chain having an uneven number of carbon atoms, said dialdehyde being further characterized in that it is soluble in said sol in an amount of at least 0.05% by weight.

11. The composition of claim 10 but further characterized in that the dialdehyde is glutaraldehyde.

References Cited in the file of this patent
UNITED STATES PATENTS

| | | |
|---|---|---|
| 2,801,216 | Yoder et al. | July 30, 1957 |
| 2,823,186 | Nickerson | Feb. 11, 1958 |